United States Patent [19]

Murase

[11] 4,246,368

[45] Jan. 20, 1981

[54] POWDER COATING COMPOSITIONS FOR FORMING MULTI LAYER COATINGS

[75] Inventor: Heihachi Murase, Hiratsuka, Japan

[73] Assignee: Kansai Paint Company, Limited, Amagasaki, Japan

[21] Appl. No.: 903,260

[22] Filed: May 5, 1978

[30] Foreign Application Priority Data

May 13, 1977 [JP] Japan ................................. 52-55043
Feb. 7, 1978 [JP] Japan ................................. 53-12601

[51] Int. Cl.³ .................... C08L 63/00; C08L 67/00; C08L 33/06; C08L 33/14
[52] U.S. Cl. .............................. 525/117; 260/39 R; 260/422.8; 525/137; 525/113; 525/118; 525/119; 525/121; 525/122; 525/124; 525/161; 525/162; 525/163; 525/164; 525/176; 525/177; 525/223; 525/228; 525/934
[58] Field of Search ...................... 260/830 TW, 836; 525/118, 119, 121, 122, 176, 177, 223, 228, 934, 117, 107

[56] References Cited

U.S. PATENT DOCUMENTS

| | | | |
|---|---|---|---|
| 3,758,633 | 9/1973 | Labana | 260/836 |
| 3,781,379 | 12/1973 | Theodore | 260/836 |
| 3,781,380 | 12/1973 | Labana | 260/836 |
| 3,787,520 | 1/1974 | Labana | 260/836 |
| 3,888,943 | 6/1975 | Labana | 260/836 |
| 3,914,333 | 10/1975 | Labana | 260/836 |
| 3,919,345 | 11/1975 | Labana | 260/830 R |
| 3,919,346 | 11/1975 | Katsimbas | 260/836 |
| 3,919,347 | 11/1975 | Katsimbas | 260/836 |
| 3,925,507 | 12/1975 | Katsimbas | 260/836 |
| 3,959,404 | 5/1976 | Labana | 260/830 TW |
| 3,963,686 | 6/1976 | Katsimbas | 260/837 R |
| 3,975,456 | 8/1976 | Labana | 260/836 |
| 3,976,715 | 8/1976 | Labana | 260/836 |
| 3,976,716 | 8/1976 | Labana | 260/836 |
| 3,976,717 | 8/1976 | Labana | 260/836 |
| 3,976,718 | 8/1976 | Labana | 260/836 |
| 3,976,719 | 8/1976 | Labana | 260/836 |
| 3,998,905 | 12/1976 | Labana | 260/836 |
| 4,006,200 | 2/1977 | Labana | 260/836 |
| 4,044,070 | 8/1977 | Labana | 260/836 |
| 4,091,049 | 5/1978 | Labana | 260/836 |

*Primary Examiner*—Paul Lieberman
*Attorney, Agent, or Firm*—Larson, Taylor and Hinds

[57] ABSTRACT

A powder coating composition for forming multi layer coatings comprising:

(1) at least one of finely divided thermosetting addition copolymers having a glass transition temperature of 35° to 75° C. and comprising as comonomers a wt. % of a hardness imparting monomer and b wt. % of a softness imparting monomer based on the copolymer wherein $a+b \leqq 60$, $b \leqq a$ and $b \leqq 20$, and (2) at least one of finely divided thermosetting resinous materials having incompatibility or low compatibility with the copolymer and a substantially greater surface tension than the copolymer when melted at the same temperature and substantially differing from the copolymer in composite parameter.

9 Claims, No Drawings

POWDER COATING COMPOSITIONS FOR FORMING MULTI LAYER COATINGS

This invention relates to powder coating compositions for forming multi layer coatings, and more particularly to a powder composition capable of forming on articles a coating film (hereinafter referred to as "composite coating") including a plurality of layers of different resins when applied in a single coat.

It is known to coat metal and like suitable substrates with powder coating compositions. It is also well known that a single coat as thick as several hundreds of microns can be formed with use of a powder coating composition. Such powder coating compositions have found wide use especially in recent years because they are free from solvents, capable of forming thick coatings as mentioned above and therefore advantageous to the environmental pollution and to the economical use of resources.

When metal, wood, plastics or other substrates are coated for decorative or protective purposes with usual coating compositions including powder coating compositions, it is more preferable to apply at least two coating compositions of different properties in a plurality of coats than to repeatedly apply a single composition to the desired thickness. In the former case, the ground coat can be formed from a composition having high adhesion to the particular substrate and other desirable properties such as corrosion resistance, whereas the top coat to be exposed to the atmosphere can be prepared from another composition having, for example, the desired color, gloss, abrasion resistance, photochemical stability, impermeability to chemicals, chemical or physical stability or other properties.

When forming composite coatings from liquid coating compositions, at least one composition must be used for each layer to give the properties required thereof, since a single liquid composition is unable to afford the plurality of layers having varying properties. Further in the case of powder coating compositions, it is usually impossible to form a composite coating from a single composition. Recently, however, a technique has been developed for electrostatically forming a corrosion-resistant composite coating in a single application with use of a mixture of at least two powdery resins having different electric chargeabilities. With this technique, consideration must be given to the specific gravity and particle size of each resin component as well as to the chargeability thereof, while the formation of the coating is affected also by the properties of the coloring pigment and other additives used conjointly with the resins. These factors make it extremely difficult to obtain the desired composite coating, and the technique still remains to be improved for wide application.

DT-OS No. 2302941 discloses a process for forming multi layer coatings. However, the multi layer coatings formed by this process comprise a surface layer of thermoplastic resin and an under layer of thermosetting resin and are low in weather resistance, solvent resistance, chemical stability and adhesive strength. Further the coating composition to be used is inferior in storage stability and thus is practically unfavorable.

Powder coating compositions of another type have also been developed for forming composite coatings without resorting to the difference in chargeability between the resin components (Japanese Patent Application Disclosure No. 122137/1976). These compositions comprise at least two powdery resins having little or no compatibility with each other and different in surface tension and in parameter for forming multilayer coatings (hereinafter referred to as "composite parameter"). The composite parameter of a resin is a value calculated from the measurement set forth afterwards. When the powder coating composition is electrostatically applied uniformly to a substrate and melted, one of the resins rapidly migrates toward an upper layer exposed to the atmosphere and another migrates toward a lower layer which is in contact with the surface to be coated, forming a composite coating in a single coat. Thus the powder coating compositions of this type is based on the technical concept that composite coatings can be formed when the factors affecting the formation of such composite coatings, i.e. compatibility, surface tension and composite parameter, are suitably adjusted in combination. The powder coating compositions of the type described, nevertheless, are poor in storage stability and physical properties especially Erichsen value.

An object of this invention is to provide a powder coating composition which is capable of forming a composite coating when applied in a single coat without resorting to the difference in chargeability between the resin components thereof and which is excellent in storage stability and physical properties especially Erichsen value.

Another object of this invention is to provide a powder coating composition capable of forming composite coatings with great ease and without resorting to a chargeability difference.

These and other objects and features of this invention will become apparent from the following description.

The present invention provides a powder coating composition comprising: (1) a finely divided thermosetting addition copolymer having a glass transition temperature of 35° to 75° C. and comprising as comonomers a wt. % of a hardness imparting monomer and b wt. % of a softness imparting monomer based on the copolymer wherein $a+b \leq 60$, $b \leq a+b \leq 60$, $b \leq a$ and $b \leq 20$, and (2) a finely divided thermosetting resinous material having incompatibility or low compatibility with the copolymer and a substantially greater surface tension than the copolymer when melted at the same temperature and substantially differing from the copolymer in composite parameter.

The powder coating composition of this invention for forming composite coatings comprises a mixture of at least two resinous materials, one of which forms the surface layer of the composite coating including a plurality of layers. This resinous material (hereinafter referred to as "Resinous Material A") essentially comprises a thermosetting addition copolymer containing as comonomers a hardness imparting monomer and a softness imparting monomer. In order to enable the powder composition to form a coating composed of a plurality of distinct layers when melted on application to the substrate, and also to permit the composition to retain sufficiently useful storage stability, and thermosetting addition copolymer, the essential component of Resinous Material A, must have a cohesive property and flowability in proper balance with each other. In other word, the copolymer must be intermediate with respect to the hardness and softness imparted by its components. Additionally the copolymer needs to have such composition that the constituent monomers combine to give the copolymer a glass transition temperature within the specified range. The hardness imparting monomer herein mentioned is a monomer which, when single homopolymerized will have a relatively high glass transition temperature which is usually in excess of 80° C. Although in no way limitative, examples of such monomers are given below along with the glass transition temperatures of the corresponding homopolymers.

| Hardness imparting monomer | Glass transition temperature (°C.) |
|---|---|
| Styrene | 100 |
| Methyl methacrylate | 105 |
| Acrylonitrile | 105 |
| Methacrylonitrile | 120 |
| Methacrylic acid | 144 |
| Acrylic acid | 86 |
| Indene | 85 |
| Isobornyl acrylate | 94 |
| 2-Chlorostyrene | 119 |
| 2-Methylstyrene | 136 |
| t-Butyl vinyl ether | 88 |
| Vinyl chloride | 81 |
| Acrylamide | 153 |

The softness imparting monomer herein mentioned is a monomer which, when singly subjected to polymerization, will give a homopolymer having a low glass transition temperature which is usually lower than 10° C. Examples of such monomers are listed below, to which, however, this invention is not limited.

| Softness imparting monomer | Glass transition temperature (°C.) |
|---|---|
| 2-Ethylhexyl acrylate | −50 |
| Methyl acrylate | 6 |
| Ethyl acrylate | −24 |
| 2-Ethylhexyl methacrylate | −10 |
| Isobutyl acrylate | −24 |
| n-Butyl acrylate | −56 |
| 2-Hydroxyethyl acrylate | −60 |
| 2-Hydroxypropyl acrylate | −60 |
| Lauryl methacrylate | −27 |
| t-Butyl acrylate | −22 |
| p-Nonylstyrene | −53 |
| n-Butyl vinyl ether | −52 |
| Vinyl fluoride | −20 |
| Isopropyl acrylate | −3 |

Monomers (hereinafter referred to as "third monomer") useful as comonomer constituents of the addition copolymer and other than the above-mentioned hardness imparting monomers and the softness imparting monomers are those which, when homopolymerized, will have a glass transition temperature outside the ranges of the corresponding glass transition temperatures of the foregoing monomers. Examples of such monomers are 2-hydroxyethyl methacrylate (having a glass transition temperature of 55° C. when homopolymerized), isobutyl methacrylate (same, 53° C.), ethyl methacrylate (same, 65° C.), glycidyl methacrylate (same, 46° C.), n-butyl methacrylate (same, 20° C.), 2-hydroxypropyl methacrylate (same, 26° C.), cyclohexyl acrylate (same, 16° C.), hexadecyl acrylate (same, 35° C.), p-octadecylstyrene (same, 32° C.). Thus useful third monomers are acrylates, methacrylates, aromatic vinyl compounds and like polymerizable ethylenically unsaturated compounds. These monomers are used singly or in admixture.

According to this invention, the hardness imparting monomer and the softness imparting monomer are used in a ratio within a specified range so as to ensure the formation of the composite coatings and to render the general properties of the resulting coatings adjustable as desired. Assuming that the thermosetting addition copolymer comprises a wt. % of the hardness imparting monomer and b wt. % of the softness imparting monomer based on the copolymer, if $a+b \leq 60$, $b \leq a$ and $b \leq 20$, and in addition, the copolymer has a glass transition temperature (Tg) in the range of from 35° C. to 75° C., ideal powder coating compositions having excellent storage stability and physical properties can be prepared for forming composite coatings.

The three requirements given above, namely $a+b \leq 60$, $b \leq a$ and $b \leq 20$, preferably $10 \leq a+b \leq 50$, $b \leq a$ and $b \leq 20$ must be fulfilled all at the same time; otherwise, the resulting powder composition will not have sufficient storage stability and also give an inferior value of Erichsen test although the thermosetting addition copolymer may have a glass transition temperature in the above-specified range.

According to this invention, it is required that the thermosetting addition copolymer have a glass transition temperature of 35° to 75° C., preferably 55° to 65° C. If this temperature is below 35° C., reduced storage stability will result even when the constituent monomers satisfy the foregoing three requirements. Conversely if it is higher than 75° C., the resulting composition will have reduced flowability when melted, giving rise to difficulty in smoothly effecting the formation of composite coatings, or rendering the coating obtained less flexible and therefore prone to damage depending on the kind of the substrate coated.

The term "glass transition temperature Tg" as herein used refers to a harmonic mean value calculated by the usual method. Assuming that the glass transition temperature of the copolymer is Tg °K. (absolute temperature) and that the comonomer constituents thereof have glass transition temperatures of $T_1$ °K., $T_2$ °K., ... $T_n$ °K. respectively when homopolymerized and are contained in the copolymer in the proportions (wt. %) of $a_1, a_2, \ldots a_n$, ($a_1+a_2+\ldots+a_n$ being 100,), the glass transition temperature Tg is given by:

$$100/Tg = a_1/T_1 + a_2/T_2 + \ldots + a_n/T_n$$

To assure the formation of composite coatings, it is required that the surface layer component of the composition separate from the other component and lose its flowability upon cross linking when the composition is heated. Accordingly Resinous Material A for forming the surface layer should have thermosetting properties and be composed essentially of an addition copolymer prepared by copolymerizing monomers having a cross-linkable functional group. Examples of the cross-linkable functional groups to be incorporated into useful copolymers are —OH,

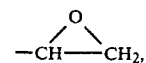

—NH$_2$, —COOH, —CO—O—CO—, —NHCH$_2$OR in which R is hydrogen or hydrocarbon having 1 to 6 carbon atoms, etc. Such a functional group may be contained in any of the hardness imparting monomer, softness imparting monomer and the third monomers. Examples of specific monomers are 2-hydroxyethyl acrylate or methacrylate, hydroxypropyl acrylate, or methacrylate, glycidyl acrylate or methacrylate, acrylic or methacrylic acid, fumaric acid, maleic anhydride, N-methylolacrylamide, N-butoxymethylacrylamide, etc.

Such cross-linkable monomers having a functional group are used as comonomers of the thermosetting addition polymers in an amount of usually 1 to 30 wt. %, preferably 5 to 25 wt. %, based on the copolymer. These monomers, when used in a proportion of less than 1 wt. %, will be unable to produce a fully developed cross-linked molecular structure, possibly failing to impart practically useful solvent resistance and hardness to the composite coatings formed. With more than 30 wt. % of such monomers present, an excessively developed cross-linked molecular structure will result, giving coatings of reduced strength, or the hydrophilic properties of the monomers are likely to render the coatings less resistant to water.

When desired, additives such as a cross linking agent, reaction accelerator, plasticizer and pigment are admixed with the addition copolymer in a molten state or are dispersed in the copolymer.

An appropriate cross linking agent is selected for use in accordance with the usual powder coating technique and depending on the type of the cross-linkable functional group in the addition copolymer. The above-mentioned mixture or dispersion is pulverized also in accordance with the usual powder coating technique to a particle size of up to 300 microns, preferably up to about 100 microns.

The powder coating composition of this invention comprises, in addition to Resinous Material A for forming a surface layer, one or more finely divided thermosetting resinous materials for forming an under layer, or an under layer and an intermediate layer. Exemplified as such resinous materials are epoxy resin, acrylic resin and polyester. It is required that at least one of the resinous materials have incompatibility or low compatibility with Resinous Material A, possess a substantially greater surface tension than Resinous Material A when melted at the same temperature and substantially differ from Resinous Material A in composite parameter.

Preferably the resinous materials have the lowest possible compatibility with Resinous Material A to assure the formation of composite coatings. The degree of compatibility can be determined in terms of the numerical value of affinity parameter usually measured by the method to be described below.

To determine the affinity parameter of the combination of two resins, one of the resins is dissolved in a mixture of toluene and methyl isobutyl ketone equal in volume to prepare a solution containing 33 wt. % of the resin. A similar solution of the other resin is also prepared. The two solutions are mixed together in amounts of equal weight at 25° C. and thoroughly stirred to obtain a uniform mixture. The mixed resin solution of 5 cm in thickness is observed with the unaided eye in natural daylight. If it is found to be perfectly transparent, the affinity parameter concerned is zero or negative, whereas if it is turbid, the parameter is positive. When the numerical value of this affinity parameter is determined, if the parameter is positive, ethylene glycol monomethyl ether acetate is added dropwise with stirring to the mixture until disappearance of the turbidity produced by the good solvent. When the parameter is zero or negative, n-hexane is added dropwise to the mixture until the mixture becomes turbid owing to the unstabilization of the solute caused by the addition of the poor solvent. The affinity parameter value $|P|$ is calculated from the following equation:

$$|P| = \frac{\Delta D}{A + B + C + \Delta D} \times K$$

where:
A and B: the weights (g) of the two resins in the solvent mixture.
C: the weight (g) of the solvent in the mixture before the addition of the good or poor solvent.
$\Delta D$: the weight (g) of the good or poor solvent added.
K: modification factor which is 1 when P is negative, or 100/45 when P is positive.

When the affinity parameter given by the equation is zero or negative, the two resins have affinity for each other, whereas if it is positive, they have no affinity. The values of the affinity parameter less than 0.1 are regarded as 0.

For the formation of composite coatings, it is critical that the affinity parameter be positive, zero or negative number of less than 0.1. If $-0.1 < P \leq 0.5$, the two resins concerned are defined as having low compatibility with each other, and if $P > 0.5$, the resins are interpreted as being incompatible with each other.

The two resins used in combination to form composite coatings must have an affinity parameter within the foregoing range as determined in the state of a solution mixture. It is further required that the resins retain incompatibility or low compatibility after the removal of the solvent. This can be determined with the use of the mixture prepared for the visual determination of the affinity parameter by applying the mixture to a transparent sheet to such a thickness as to form about 50-micron-thick dry film thereon, evaporating off the solvent at room temperature for 24 hours and observing the resulting dry film with light passing therethrough or diffusedly reflected therefrom. When thus observed, the film must be found to have turbidity or separation of the resins.

In the case where at least one of the resins is insoluble in the mixture of solvents, the measurement of affinity parameter through the above method is impossible, however, the positive and negative of the parameter can be known by a different method. That is, in the case of insoluble resins such as polyethylene and polyamide, the borders of molded resin sheets of 400 to 500 microns in thickness are brought into contact with each other on a glass surface, and they are heated to a temperature at which both resins are completely melted and maintained as they stand at that temperature for about 30 minutes. If the affinity parameter between the resins is positive number, both resins remain discontinuous forming boundary surfaces or boundary layers. If the affinity parameter is negative number, the compositions of resins are continuously varied by mutual diffusion effect without forming any observable boundary surface.

The resinous materials for forming the under and intermediate layers must have a substantially greater surface tension than Resinous Material A when compared in a molten state at the same temperature. The difference in surface tension should be as great as possible and is usually at least 1.0 dyne/cm, preferably at least 2.0 dynes/cm. It is then possible to obtain composite coatings with ease. If the difference is less than 1.0 dyne/cm, the complete separation of resin components is not expected, especially in the surface layer, and the formation of composite coatings becomes irregular.

Most accurately, the surface tension of each resin component of the powder coating composition should be measured at a temperature immediately above the highest of the melting temperatures of the resin components, namely at the temperature at which the composition as applied to the substrate is melted for the formation of a coating. In practice, however, it seems to be quite well that the comparison of surface tension is done at a given temperature of 180° to 200° C. in any of resin materials.

The method for measuring the surface tension $\sigma L$ (dyne/cm) of a resinous material is not particularly limited. For example, the surface tension can be obtained with the following equation of Neumann and Sell from the contact angle $\theta$ between the resinous material and Teflon (trade mark of tetrafluoroethylene resin) plate.

$$\cos \theta = \frac{(0.015 \sigma s - 2)\sqrt{\sigma s \sigma L} + \sigma L}{\sigma L (0.015 \sqrt{\sigma s \sigma L} - L)}$$

in which $\sigma s$ is the surface tension (dyne/cm) of Teflon plate. In this invention, approximate values are obtained by graphical solution on the assumption of $\sigma s = 18.6$ dynes/cm.

With regard to the method for measuring the contact angle of the molten resinous material relative to Teflon plate at a certain temperature, for example, at 180° C. or 200° C., any method can be adopted so far as it determines advancing contact angles.

For instance, a hemispherical resin to be tested having a diameter of 2 mm is placed on a horizontal surface of a Teflon plate with the spherical surface down. They are then put in a thermostatic room at a predetermined temperature to fuse the hemispherical resin. When the fused resin reaches the equilibrium, it is observed with a magnifying projector or a telescope to measure the contact angle.

When the melting temperature of the resinous material to be tested is too high and the surface tension can not be calculated directly from the value of contact angle with Teflon at the predetermined temperature, the contact angle of the resinous material with water is measured at 20° C. to obtain the surface tension of the material at 20° C. While, the contact angle of the material at a temperature just above its melting point is measured by the above-described method in place of the value at the predetermined temperature and the surface tension is calculated from such value. Thus, the surface tension at the predetermined temperature is obtained from the above results by interpolation.

In order to enable the powder coating composition of this invention to form a composite coating composed of layers completely separated on melting, the molten under layer forming resinous material must be strongly attracted to the substrate. Such selective attraction of the molten resinous material to the substrate is governed by the combination of various factors such as the surface tension, viscosity and specific gravity of the material, and the temperature at which the material is melted. The inventor of the present invention has found that the degree of the attraction of a molten resinous material to a polar surface as of metal, glass, ceramic or like article can be quantitatively expressed in terms of a composite parameter, and that the difficulty or ease with which a composite coating is formed can be most easily indicated by the ratio between the composite parameters of the constituent resins of the coating.

The composite parameter of a resin is a value calculated from the measurement obtained by measuring the level to which the resin in a molten state rises in a glass tube of specified diameter within a given period of time. The parameter numerically represents the combination of the factors which will affect the formation of composite coatings and which include the surface tension, melt viscosity and specific gravity of the resin and the temperature at which the resin is melted. Stated more specifically, the parameter is determined by the following procedure.

A predetermined quantity of 0.15 g of solid resin to be tested is fed into a cylindrical vessel made of heat-resistant glass having an inner diameter of 12 cm. A thin tube (outer diameter: 4.0 mm, inner diameter: 2.5 mm) made of heat-resistant glass with the cleaned inner surface, is placed vertically and coaxially in the cylindrical vessel so as to lower freely by its own gravity. The under surface of this thin tube is ground perpendicularly to the axis of the tube and notches are formed in the under surface so as to allow the molten resin to pass through. The whole of this measuring system is placed into a thermostatic room maintained at a predetermined temperature, in which the bottom surface of the cylindrical vessel must be made horizontal. Thus, the resin to be measured is fused and forms a molten resin layer in the cylindrical vessel. With the melting of the resin, the thin tube comes into contact with the bottom surface of the cylindrical vessel, at the same time, the molten resin flows into the thin tube. The molten resin to be tested presents not only the meniscus in the thin tube but also the phenomenon of what is called "creeping" to advance along the inner wall surface of the thin tube. The velocity of this creeping indicates the degree of attraction of the resin by the polar surface such as glass. After 25 minutes from the start of heating in the thermostatic room, the height Ht (cm) from the upper edge of the creeping portion to the bottom surface of the cylindrical vessel is measured and the composite parameter ht (g/cm$^2$) is preferably determined by multiplying the above Ht by the density $\rho$ (g/cm$^3$) of the molten resin, i.e. ht (g/cm$^2$) = Ht (cm) × $\rho$(g/cm$^3$).

The temperature of measuring the composite parameter is preferably set to the temperature just above the maximum melting temperature of component resins. When the measurement of the composite parameter of the resin by continuously heating for 25 minutes is difficult since the resin is decomposed or hardened by such treatment, the composite parameter of the resin is measured at two points or more in the range from the temperature just above the melting point of the resin to a higher temperature which is free from such difficulty. The composite parameter at the predetermined temperature may be obtained from such parameters by extrapolation. In another method, assuming that the rising velocity of the top edge of the creeping portion is even, the heating time of 25 minutes is shortened and the result is converted into the value for 25 minutes, which is generally acceptable for practical purpose.

According to this invention, the under layer forming resin must have a substantially greater composite parameter than the surface layer forming thermosetting resin. More specifically, the ratio of the parameter of the former to that of the latter is preferably at least 1.3, more preferably at least 1.5. If this ratio is smaller than 1.3, the resin components will not be fully separated, giving a coating of incompletely separated layers.

When at least two resinous materials are used for forming under layers, the combination of these two materials need not always fulfill the requirements specified above, insofar as these materials satisfy the requirements relative to the surface layer forming resinous material A. As for as the relation between the resinous materials for forming the under layers are concerned, the materials must have incompatibility or low compatibility with each other and need to fulfill only one of the requirements specified for the surface tension and composite parameter, whereby composite coatings composed of at least three layers can be formed with ease.

The under layer forming resinous materials may incorporate, as mixed therewith by melting or dispersed therein, the desired cross linking agent as well as a pigment and other additives desired.

All the resinous components need only to have such particle sizes that are suited to powder coating method to be used such as electrostatic coating fluidized bed coating and so forth. For the formation of composite coatings, it is not particularly necessary to use a composition having accurately adjusted particle size distribution, but it is desirable that the coating composition have particle sizes of up to 300 microns, preferably up to 100 microns. Furthermore when the particle size of the resinous components having the greatest composite parameter is made relatively small, the formation of composite coatings, especially the separation of the components in the under side of the coating, can be promoted since the composite parameter relates to the easiness of melting. The proportion of each finely divided resinous material for forming a layer when separated on melting must be at least 10 wt. %, preferably at least 30 wt. %, based on the composition. The component which is used in a proportion of less than 10 wt. % is unable to form a completely separate layer.

The distribution of the resinous components forming the layers of the composite coating of this invention can be confirmed by various methods. For example, when each component resin is differently colored with coloring pigments respectively, the formation of composite coatings can be confirmed by observing a cross-section of the cured coating obtained or by grinding the coating film from the surface layer and observing a change of color. When the layered structure is not ascertainable with the use of colors, different layers can be identified by grinding the coating and analyzing the composition of resulting fragments by infrared absorption spectroscopy or examining the infrared reflection spectrum of the exposed ground surface.

According to the present invention, a composite coating composed of a plurality of layers can be formed in a single coat with extreme ease, with each of the layers given a specific property such as weather resistance or adhesion desirable for the purpose contemplated. Thus the invention assures an efficient coating operation. Moreover such composite coatings can be formed free of the drawbacks heretofore experienced.

This invention will be described below in greater detail with reference to examples, in which the parts and percentages are all by weight.

EXAMPLE 1

One hundred parts of an acrylic resin (Tg=60.5° C., a=30, b=5, number average molecular weight: about 2000) prepared by copolymerizing 20% of styrene, 10% of methyl acrylate, 45% of isobutyl methacrylate, 5% of 2-ethylhexyl methacrylate and 20% of glycidyl methacrylate, 16 parts of decane dicarboxylic acid and 20 parts of titanium dioxide (rutile type) are mixed together and pulverized. The mixture is further treated by the hot roll mill to prepare a uniform dispersion, which is then pulverized and screened with a 200-mesh sieve to obtain Component I.

Subsequently 100 parts of Epikote 1004 (trade mark of an epoxy resin produced by Shell Chemical Co., Ltd.), 20 parts of red iron oxide and 5.5 parts of dihydrazide adipate are mixed together. The mixture is treated in the same manner as above to obtain Component II.

Components I and II have the affinity parameter p, surface tension r (dynes/cm) and composite parameter h (g/cm²) listed below.

| Component | p | r | h |
|---|---|---|---|
| I |  | 32.4 | 0.26 |
|  | 0.25 |  |  |
| II |  | 35.3 | 0.38 |

Components I and II are mixed together in the weight ratio of 40/60 to prepare a powder coating composition for forming composite coatings. The coating composition is electrostatically applied to 0.5-mm-thick mild steel panels treated with zinc phosphate, and the coated panels are heated at 175° C. for 30 minutes to obtain a cured coating, about 90 μm in thickness, on the panels. The coating is progressively ground from above toward the substrate to observe a change in the color of pigment. The coating is also examined by infrared spectroscopic analysis. Consequently the coating is found to have been composed of an under layer of epoxy resin and a surface layer of acrylic resin.

The composition remains free of any change when allowed to stand in a container at 35° C. for one month and therefore has excellent storage stability, while the coating has an Erichsen value of 4.5 mm. These properties are superior to those heretofore achieved.

Note: Erichsen test

The coated plate was placed in a constant temperature and humidity chamber kept at 20° C. and a humidity of 75 percent for one hour. Thereafter, the plate was set on Erichsen testing machine with the coating positioned outside. A punch having a radius of 10 mm was pushed outward predetermined distances in contact with the rear face of the plate at as uniform speed as possible of about 0.1 mm/sec. The pushed out portion of the plate was checked by the naked eye for cracking or peeling immediately after pushing out to determine the maximum distance (mm) of stroke of the punch causing no changes on the coating.

EXAMPLE 2

One hundred parts of an acrylic resin (Tg=69.1° C., a =35, b=0, number average molecular weight: about 12000) prepared by copolymerizing 20% of styrene, 15% of methyl methacrylate, 45% of isobutyl methacrylate and 20% of hydroxyethyl methacrylate, 24 parts of modified hexamethylolmelamine (grade No. px-3000, product of Sanwa Chemical Co., Ltd., Japan), 10 parts of titanium dioxide (rutile type) and 2 parts of Phthalocyanine Blue (product of Sumitomo Chemical Co., Ltd., Japan) are mixed together and pulverized. The mixture is treated in the same manner as in Example 1 to prepare Component I.

Subsequently 70 parts of Epikote 1004, 30 parts of Epikote 1007 (trade mark of an epoxy resin produced by Shell Chemical Co., Ltd.), 20 parts of titanium dioxide (rutile type) and 5 parts of modified dicyandiamide (grade No. HT-2844, product of Ciba-Geigy Corp.) are mixed together. The mixture is treated in the same manner as above to obtain component II.

Components I and II have the affinity parameter p, surface tension r (dynes/cm) and composite parameter h listed below.

| Component | p | r | h |
|---|---|---|---|
| I |  | 32.6 | 0.23 |
|  | 0.31 |  |  |
| II |  | 36.1 | 0.42 |

Components I and II are mixed together in the weight ratio of 50/50 to prepare a powder coating composition for forming composite coatings. The coating composition is electrostatically applied to the same mild steel panels as used in Example 1, and the coated panels are heated to 180° C. and 30 minutes to obtain a cured coating, about 115 μm in thickness, on the panels. The coating is examined in the same manner as in Example 1 to find that it is composed of a plurality of layers.

The composition remains free of any change when allowed to stand in a container at 38° C. for one month and therefore has excellent storage stability, while the coating has an Erichsen value of 5.0 mm.

EXAMPLE 3

One hundred parts of an acrylic resin (Tg=57.8° C., a=7, b=3, number average molecular weight: about 9500) prepared by copolymerizing 3% of acrylamide, 4% of α-methylstyrene, 70% of isobutyl methacrylate, 3% of methy acrylate and 20% of hydroxyethyl methacrylate, and 23 parts of a curing agent of modified hexamethylolmelamine type (grade No. PX-2000, product of Sanwa Chemical Co., Ltd.) are mixed together and pulverized. The mixture is further treated by the hot roll mill to prepare a uniform dispersion, which is then pulverized and screened with a 200-mesh sieve to obtain Component I.

Subsequently Component II is prepared from 100 parts of a polyester (number average molecular weight: about 6000), 25 parts of the same curing agent (PX-2000) as above, 30 parts of rutile-type titanium dioxide and 5 parts of Phthalocyanine Green (product of Sumitomo Chemical Co., Ltd., Japan), the polyester being prepared from 51.9% of dimethyl terephthalate, 11.1% of isophthalic acid, 33.8% of neopentyl glycol and 3.2% of glycerin by condensation polymerization in the usual manner.

Components I and II have the affinity parameter p, surface tension r (dynes/cm) and composite parameter h (g/cm$^2$) listed below.

| Component | p | r | h |
|---|---|---|---|
| I |  | 31.5 | 0.28 |
|  | 0.23 |  |  |
| II |  | 38.2 | 0.40 |

Components I and II are mixed together in the weight ratio of 40/60 to prepare a powder coating composition for forming composite coatings. The coating composition is electrostatically applied to 0.6-mm-thick mild steel panels treated with iron phosphate, and the coated panels are heated at 190° C. for 30 minutes to obtain a cured coating, about 120 μm in thickness, on the panels. The coating is examined in the same manner as in Example 1 to find that it is composed of a plurality of layers.

The composition remains free of any change when allowed to stand in a container at 30° C. for one month and therefore has excellent storage stability, while the coating has an Erichsen value of 4.0 mm.

EXAMPLE 4

One hundred parts of an acrylic resin (number average molecular weight: about 12000) prepared by copolymerizing 9% of methyl methacrylate, 18% of styrene, 19% of 2-ethylhexyl acrylate, 39% of n-butyl methacrylate and 15% of glycidyl methacrylate, and 12.5 parts of decane dicarboxylic acid are mixed together, and the mixture is pulverized to prepared Component I up to 74μ in maximum particle size and about 45μ in average particle size. Component I has a composite parameter h of 0.29 g/cm$^2$ (at 180° C., the same as hereinafter), surface tension of 30.7 dynes/cm (at 180° C., the same as hereinafter).

Subsequently 20 parts of Epikote 1007, 80 parts of Epikote 1004, 15 parts of trimellitic anhydride and 30 parts of rutile-type titanium dioxide are mixed together, and the mixture is pulverized to the same particle size as above to obtain Component II. Component II has a composite parameter of 0.42 g/cm$^2$ and surface tension of 34.5 dynes/cm.

Components I and II have an affinity parameter of 0.30.

Components I and II are mixed together in the weight ratio of 40/60 to obtain a powder coating composition for forming composite coatings.

The coating composition is electrostatically applied to 0.5-mm-thick mild steel panels which have been surface-treated with zinc phosphate and then electrodeposited with Elecron No. 9000 (trade mark of electrophoretic coating composition produced by Kansai Paint Co., Ltd., Japan). The coated panels are heated at 180° C. for 30 minutes to obtain a cured coating composed of a white epoxy resin layer about 70μ in thickness and a transparent acrylic resin layer covering the layer and having a thickness of about 50μ.

In each of the following examples, coated panels are obtained in the same manner as above with use of the powder coating composition prepared, whereby a coating is formed which is composed of an acrylic resin surface layer and an under layer in thicknesses corresponding to the proportions of the components used.

EXAMPLE 5

Component I having the same particle size as in Example 4 (the same as hereinafter) is prepared in the same manner as in Example 4 (the same as hereinafter) from 100 parts of an acrylic resin (number average molecular weight: about 10000) prepared by copolymerizing 10% of styrene, 5% of acrylonitrile, 15% of 2-hydroxyethyl acrylate and 70% of ethyl methacrylate, 20 parts of a blocked isocyanate curing agent (xylylene diisocyanate blocked with ε-caprolactum and containing 19% of NCO groups), 5 parts by weight of Phthalocyanine Blue and 20 parts of rutile-type titanium dioxide. Component I has a composite parameter of 0.38 g/cm$^2$ and surface tension of 32.5 dynes/cm.

Subsequently 100 parts of Epikote 1004, 30 parts of blocked isocyanate curing agent (a mixture of xylynene diisocyanate and isophorone diisocyanate in equal weights blocked with benzyl alcohol and containing 20% of NCO groups) and 30 parts of red iron oxide are mixed together and pulverized to obtain Component II having a composite parameter of 0.45 g/cm$^2$ and surface tension of 34.6 dynes/cm.

Components I and II, having an affinity parameter of 0.26, are mixed together in the weight ratio of 40/60 to obtain a powder coating composition for forming composite coatings.

EXAMPLE 6

Component I is prepared from 100 parts of an acrylic resin (number average molecular weight: about 9000 prepared by copolymerizing 8% of styrene, 6% of 2-ethylhexyl methacrylate, 66% of isobutyl methacrylate and 20% of hydroxypropyl methacrylate, and 20 parts of a blocked isocyanate curing agent (the same as one used for Component I in Example 5). Component I has a composite parameter of 0.35 g/cm$^2$ and surface tension of 29.3 dynes/cm.

Subsequently 100 parts of polyester (number average molecular weight: about 8000, acid value: 19.5), 30 parts of a blocked isocyanate curing agent (the same as one used for Component II in Example 5), 20 parts of rutile-type titanium dioxide and 10 parts of yellow iron oxide (trade mark: "Mapico Yellow" product of Chitan Industries Co.) are mixed together, the polyester being prepared from 40.7% of dimethyl terephthalate, 11.6% of isophthalic acid, 10.2% of adipic acid, 34.2% of neopentyl glycol and 3.3% of glycerin by condensation polymerization in the usual manner. The mixture is pulverized to obtain Component II having a composite parameter of 0.47 g/cm$^2$ and surface tension of 36.3 dynes/cm.

Components I and II, having an affinity parameter of 0.60, are mixed together in the weight ratio of 35/65 to obtain a powder coating composition for forming composite coatings.

EXAMPLE 7

Component I is prepared from 100 parts of an acrylic resin (number average molecular weight: about 16000) prepared by copolymerizing 5% of styrene, 80% of isobutyl methacrylate and 15% of glycidyl methacrylate, and 12.5 parts of decane dicarboxylic acid. Component I has a composite parameter of 0.32 g/cm$^2$ and surface tension of 27.6 dynes/cm.

Subsequently 100 parts of an acrylic resin (number average molecular weight: about 8000) prepared by copolymerizing 25% of styrene, 10% of methyl methacrylate, 20% of 2-ethylhexyl methacrylate, 25% of n-butyl methacrylate and 20% of 2-hydroxyethyl methacrylate, 30 parts of a blocked isocyanate curing agent (isophorone diisocyanate blocked with ε-caprolactum) and 35 parts of yellow titanium oxide (product of Ishihara Sangyo Co., Ltd.) are mixed together. The mixture is pulverized to obtain Component II for forming an under layer, having a composite parameter of 0.42 g/cm$^2$ and surface tension of 33.1 dynes/cm.

Components I and II, having an affinity parameter of 0.08, are mixed together in the weight ratio of 40/60 to obtain a powder coating composition for forming composite coatings.

EXAMPLE 8

Component I is prepared from 100 parts of an acrylic resin (number average molecular weight: about 15000 prepared by copolymerizing 2% of 2-ethylhexyl methacrylate, 80% of isobutyl methacrylate and 18% of 2-hydroxyethyl methacrylate, and 20 parts of a blocked isocyanate curing agent (the same as one used for Component I in Example 5). Component I has a composite parameter of 0.31 g/cm$^2$ and surface tension of 28.5 dynes/cm.

Subsequently 100 parts of a polyester (number average molecular weight: about 6000, acid value: about 30) prepared from 51.9% of dimethyl terephthalate, 11.1% of isophthalic acid, 33.8% of neopenthyl glycol and 3.2% of glycerin by condensation polymerization in the usual manner, 25 parts of modified hexamethylolmelamine (the same as one used in Example 3), 30 parts of rutile-type titanium dioxide and 5 parts of Phthalocyanine Green are mixed together and pulverized to obtain Component II having a composite parameter of 0.41 g/cm$^2$ and surface tension of 38.2 dynes/cm.

Components I and II, having an affinity parameter of 0.23, are mixed together in the weight ratio of 50/50 to obtain a powder coating composition for forming composite coatings.

EXAMPLE 9

Component I is prepared from 100 parts of an acrylic resin (number average molecular weight: about 12000) prepared by copolymerizing 16% of styrene, 6% of acrylamide, 16% of 2-ethylhexyl methacrylate, 54% of isobutyl methacrylate and 8% of 2-hydroxyethyl methacrylate, 20 parts of a hexamethylolmelamine-type curing agent (px-2000) and 15 parts of titanium dioxide. Component I has a composite parameter of 0.28 g/cm$^2$ and surface tension of 32.2 dynes/cm.

Subsequently Component II is prepared from 100 parts of Epikote 1004, 30 parts of "PX-2000" and 20 parts of yellow iron oxide (Mapico Yellow). Component II has a composite parameter of 0.37 g/cm$^2$ and surface tension of 36.5 dynes/cm.

Components I and II, having an affinity parameter of 0.26, are mixed together in the weight ratio of 50/50 to obtain a powder coating composition for forming composite coatings.

EXAMPLE 10

Component I is prepared from 100 parts of an acrylic resin (number average molecular weight: about 9000) prepared by copolymerizing 22% of styrene, 18% of 2-ethylhexyl methacrylate, 42% of isobutyl methacrylate, 16% of 2-hydroxyethyl methacrylate and 2% of n-butyl-etherified N-methylolacrylamide, and 20 parts of a hexamethylolmelamine-type curing agent (PX-2000). Component I has a composite parameter of 0.40 g/cm$^2$ and surface tension of 33.0 dynes/cm.

Subsequently Component II is prepared from 100 parts of Epikote 1002 (trade mark of an epoxy resin produced by Shell Chemical Co., Ltd.) 4.5 parts of dicyandiamide and 20 parts of chromium oxide. Component II has a composite parameter of 0.53 g/cm$^2$ and surface tension of 37.4 dynes/cm.

Components I and II, having an affinity parameter of 0.15 are mixed together in the weight ratio of 40/60 to obtain a powder coating composition for forming composite coatings.

EXAMPLE 11

Component I is prepared from 100 parts of an acrylic resin (number average molecular weight: about 14000) prepared by copolymerizing 14% of styrene, 18% of 2-ethylhexyl methacrylate, 58% of isobutyl methacrylate, 8% of acrylic acid and 2% of maleic anhydride and 10 parts of Epikote 1001 (trade mark of an epoxy resin produced by Shell Chemical Co., Ltd.). Component I has a composite parameter of 0.37 g/cm$^2$ and surface tension of 31.3 dynes/cm.

Subsequently Component II is prepared from 100 parts of the same polyester as used for Component II in Example 6, 30 parts of the same blocked isocyanate curing agent as used for Component II in Example 5 and 30 parts of yellow titanium dioxide. Component II has a composite parameter of 0.49 g/cm$^2$ and surface tension of 37.4 dynes/cm.

Components I and II, having an affinity parameter of 0.46, are mixed together in the weight ratio of 40/60 to obtain a powder coating composition for forming composite coatings.

What is claimed is:

1. A multi-layer forming powder coating composition comprising:
   (1) at least one of finely divided thermosetting addition copolymers having a glass transition of 35° to 75° C. and comprising as comonomers a wt. % of a hardness imparting monomer which, when singly polymerized, will have a glass transition temperature of higher than 80° C. and b wt. % of a softness imparting monomer which, when singly polymerized, will have a glass transition temperature of up to 10° C. based on the copolymer wherein a+b≦60, b≦a and b≦20, said hardness imparting monomer being at least one species selected from the group consisting of styrene, methyl methacrylate, acrylonitrile, methacrylic acid, acrylic acid, indene, isobornyl acrylate, 2-chlorostyrene, 2-methylstyrene, t-butyl vinyl ether, vinyl chloride and acrylamide, and said softness monomer being at least one species selected from the group consisting of 2-ethylhexyl acrylate, methyl acrylate, ethyl acrylate, 2-ethylhexyl methacrylate, isobutyl acrylate, n-butyl acrylate, 2-hydroxyethyl acrylate, 2-hydroxypropyl acrylate, lauryl methacrylate, t-butyl acrylate, p-nonylstyrene, n-butyl vinyl ether, vinyl fluoride and isopropyl acrylate, and
   (2) at least one of finely divided thermosetting resinous materials selected from the group consisting of epoxy resin, acrylic resin and polyester having incompatibility or low compatibility with the copolymer and a substantially greater surface tension than the copolymer when melted at the same temperature and substantially differing from the copolymer in composite parameter ht, the ratio of the composite parameter of said resinous material to said copolymer being at least 1.3, wherein the affinity parameter P between said copolymer and resinous material, calculated by the following equation $$|P| = \frac{\Delta D}{A + B + C + \Delta D} \times K$$

A and B: the weights (g) of the two resins in the solvent mixture,
C: the weight (g) of the solvent in the mixture before the addition of the good or poor solvent,
ΔD: the weight (g) of the good or poor solvent added,
K: modification factor which is 1 when P is negative, or 100/45 when P is positive, is positive, zero or negative number of less than 0.1, the composite parameter ht is calculated by the following equation ht = Ht × ρ

HT: the height (cm) of creeping of the resin in a molten state,
ρ: density (g/cm$^3$) of the molten resin, and the proportion of each finely divided resinous material is at least 10 wt. % based on the composition.

2. The powder coating composition for forming composite coatings according to claim 1 in which said a and b are in the range of 10≦a+b≦50, b≦a and b≦20.

3. The powder coating composition for forming multi layer coatings according to claim 1 in which said copolymer further comprises a monomer which then singly polymerized, will have a glass transition temperature outside the ranges of the corresponding glass transition temperature of a hardness imparting monomer and softness imparting monomer.

4. The powder coating composition for forming multi layer coatings according to claim 3 in which said monomer is at least one species selected from the group consisting of 2-hydroxyethyl methacrylate, isobutyl methacrylate, ethyl methacrylate, glycidyl methacrylate, n-butyl methacrylate, 2-hydroxypropyl methacrylate, cyclohexyl acrylate, hexadecyl acrylate and n-octadecylstyrene.

5. The powder coating composition for forming multi layer coatings according to claim 1 in which said copolymer has a glass transition temperature of 55° to 65° C.

6. The powder coating composition for forming multi layer coatings according to claim 1 in which said affinity parameter P is 0≦P≦0.5 or P>0.5.

7. The powder coating composition for forming multi layer coatings according to claim 1 in which a surface tension of said resinous material is at least 1.0 dyne/cm more than that of said copolymer.

8. The powder coating composition for forming multi layer coatings according to claim 1 in which said ratio of the composite parameter is at least 1.5.

9. A method for preparing multi layer coatings using the powder coating composition claimed in claim 1.

* * * * *